(12) United States Patent
Choi et al.

(10) Patent No.: US 8,893,436 B2
(45) Date of Patent: Nov. 25, 2014

(54) INVISIBLE SLIDING DOOR LINK STRUCTURE

(71) Applicants: Hyundai Motor Company, Seoul (KR); Kwangjin Co., Ltd., Asan-si (KR)

(72) Inventors: Jae Hong Choi, Gwangmyeong-si (KR); Seung Tae Kim, Asan-si (KR)

(73) Assignees: Hyundai Motor Company, Seoul (KR); Kwangjin Co., Ltd., Asan-Si, Chungcheongnam-Do (KR)

( * ) Notice: Subject to any disclaimer, the term of this patent is extended or adjusted under 35 U.S.C. 154(b) by 0 days.

(21) Appl. No.: 13/933,863

(22) Filed: Jul. 2, 2013

(65) Prior Publication Data

US 2014/0259938 A1 Sep. 18, 2014

(30) Foreign Application Priority Data

Mar. 15, 2013 (KR) .................. 10-2013-0027738

(51) Int. Cl.
| | |
|---|---|
| *E05F 15/14* | (2006.01) |
| *E05D 15/06* | (2006.01) |
| *E05F 15/00* | (2006.01) |
| *E05D 15/10* | (2006.01) |
| *B60J 5/04* | (2006.01) |

(52) U.S. Cl.
CPC ............ *E05D 15/10* (2013.01); *E05D 15/0608* (2013.01); *E05F 15/00* (2013.01); *B60J 5/0468* (2013.01)
USPC .................. 49/208; 49/153; 49/216; 49/360; 296/155

(58) Field of Classification Search
CPC ..................... E05Y 2900/531; E05Y 2600/46; E05Y 2600/41; B60J 5/06; E05F 15/146; E05D 15/101
USPC ........... 49/149, 152, 153, 208–210, 216–223, 49/360; 296/146.11, 146.12, 155
See application file for complete search history.

(56) References Cited

U.S. PATENT DOCUMENTS 4,606,146 A * 8/1986 Jozefozak ........................ 49/216
5,507,119 A * 4/1996 Sumiya et al. .................. 49/218
5,921,613 A * 7/1999 Breunig et al. ................ 296/155

(Continued)

FOREIGN PATENT DOCUMENTS

| | | |
|---|---|---|
| JP | 6-18033 | 3/1994 |
| JP | 2009-161086 A | 7/2009 |
| KR | 10-0448753 B1 | 9/2004 |
| KR | 10-2014-0082278 A | 7/2014 |

*Primary Examiner* — Katherine Mitchell
*Assistant Examiner* — Justin Rephann
(74) *Attorney, Agent, or Firm* — McDermott Will & Emery LLP (57) ABSTRACT

An invisible sliding door link structure includes a door bracket disposed at an inner surface of a door sliding part of a vehicle body to open or close, a body bracket provided in an invisible slider to slide the door, a main arm with one end connected to one side of the door bracket and the other end connected to one side of the body bracket, a first link having one end rotatably connected to the other side of the body bracket, a second link having one end rotatably connected to the other end of the first link and the other end connected to the other side of the door bracket, and a third link having one end rotatably connected to one side of the main arm and the other end connected to a hinge point at which the first and second links are connected to each other.

5 Claims, 7 Drawing Sheets

(56) References Cited

U.S. PATENT DOCUMENTS

| | | | |
|---|---|---|---|
| 6,030,024 A * | 2/2000 | Schmidhuber et al. | 296/146.12 |
| 6,248,172 B1 * | 6/2001 | Shirotani et al. | 118/500 |
| 6,382,705 B1 * | 5/2002 | Lang et al. | 296/146.12 |
| 6,793,268 B1 * | 9/2004 | Faubert et al. | 296/146.12 |
| 7,143,548 B2 * | 12/2006 | Kleinmann et al. | 49/345 |
| 7,393,044 B2 * | 7/2008 | Enomoto | 296/155 |
| 7,644,976 B2 * | 1/2010 | Suzuki et al. | 296/146.12 |
| 7,731,270 B2 * | 6/2010 | Fischer et al. | 296/155 |
| 7,748,770 B2 * | 7/2010 | Heuel et al. | 296/155 |
| 7,765,740 B2 * | 8/2010 | Heuel et al. | 49/360 |
| 7,856,759 B2 * | 12/2010 | Elliott et al. | 49/358 |
| 8,096,606 B2 * | 1/2012 | Hanaki et al. | 296/155 |
| 8,141,297 B2 * | 3/2012 | Elliott et al. | 49/358 |
| 8,469,441 B2 * | 6/2013 | Heuel et al. | 296/155 |
| 2003/0204999 A1 * | 11/2003 | George et al. | 49/216 |
| 2009/0000200 A1 * | 1/2009 | Heuel et al. | 49/209 |
| 2009/0051194 A1 * | 2/2009 | Elliott et al. | 296/146.11 |
| 2009/0072583 A1 * | 3/2009 | Elliott et al. | 296/155 |
| 2009/0200833 A1 * | 8/2009 | Heuel et al. | 296/155 |
| 2009/0212592 A1 * | 8/2009 | Takahashi | 296/155 |
| 2010/0095595 A1 * | 4/2010 | Hanaki et al. | 49/359 |
| 2010/0263283 A1 | 10/2010 | Yoshioka | |
| 2011/0010998 A1 * | 1/2011 | Elliott et al. | 49/260 |
| 2011/0061304 A1 * | 3/2011 | Elliott et al. | 49/358 |
| 2011/0131883 A1 * | 6/2011 | Heuel et al. | 49/212 |
| 2011/0133516 A1 * | 6/2011 | Heuel et al. | 296/202 |
| 2011/0198883 A1 * | 8/2011 | Heuel et al. | 296/149 |

* cited by examiner

INVISIBLE SLIDING DOOR LINK STRUCTURE

CROSS-REFERENCE TO RELATED APPLICATION

This application is based on and claims priority from Korean Patent Application No. 10-2013-0027738, filed on Mar. 15, 2013 in the Korean Intellectual Property Office, the disclosure of which is incorporated herein in its entirety by reference.

TECHNICAL FIELD

The present disclosure relates to an invisible sliding door link structure, and more particularly, to a link structure for opening or closing an invisible sliding door capable of being operated without a rail structure of a vehicle body.

BACKGROUND

Generally, a vehicle provided with a sliding door has a structure in which the door is slid to be as close as possible to a vehicle body when opening to improve convenience in getting on and getting off the vehicle in a narrow space.

Figure 1:
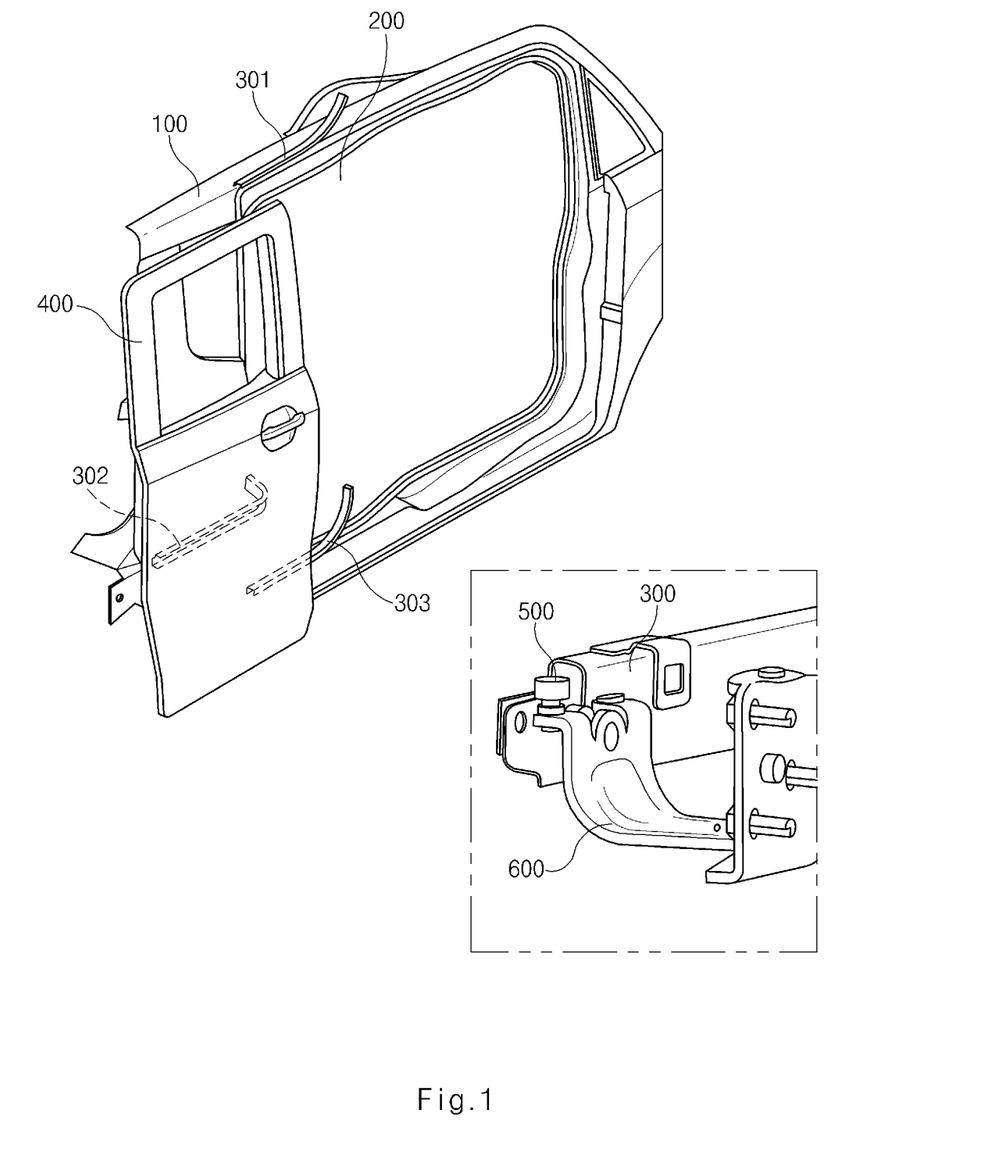
FIG. 1 is a view showing a structure of a sliding door according to the prior art.
Figure 2:
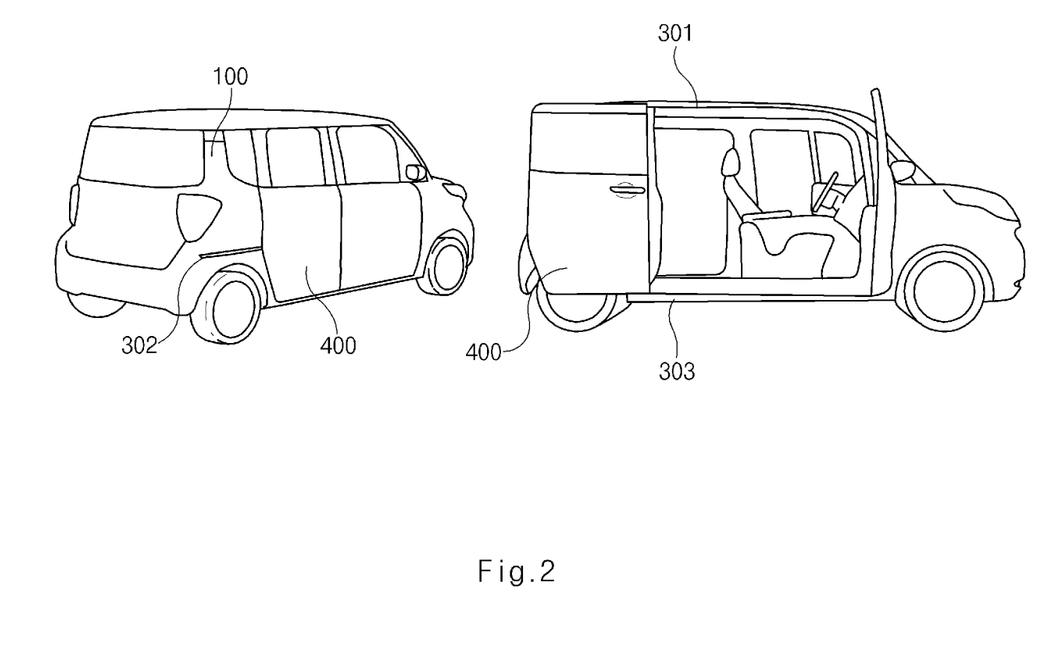
FIG. 2 is a view showing a vehicle provided with the sliding door according to the prior art.

As shown in FIGS. 1 and 2, a sliding door of a vehicle according to the prior art includes a vehicle body 100 provided with a door opening part 200 to be opened or closed by sliding of a door 400 to allow a passenger to get on or get off the vehicle therethrough; a rail 300 provided in the vehicle body 100 in order to slide the door 400; a roller 500 inserted into the rail 300 provided in the vehicle body 100; and an arm 600 with one side fixed to the door 400 and the other side supporting the roller 500. The rail 300 includes an upper rail 301 provided in the vehicle body 100 adjacent to an upper side of the door opening part 200, a lower rail 303 provided in the vehicle body 100 adjacent to a lower side of the door opening part 200, and a center rail 302 disposed at the rear of the vehicle body 100 and extended in a length direction of the vehicle on an outer surface of the vehicle body 100. An operation of the sliding door is regulated according to a layout of the rail 300 described above.

However, the sliding door according to the prior art as described above has problems in that a structure of the door opening part 200 of the vehicle body 100 becomes complicated by the rail 300, the center rail 302 is provided on the outer surface of the vehicle body 100, such that an appearance of the vehicle is deteriorated, and many design restrictions are present in the vehicle due to the rail.

SUMMARY

The present disclosure has been made to solve the above-mentioned problems occurring in the prior art while advantages achieved by the prior art are maintained intact.

One subject to be achieved by the present disclosure is to provide an invisible sliding door link structure for an invisible sliding door capable of being operated without a rail structure of a vehicle body.

An aspect of the present disclosure, provides an invisible sliding door link structure including: a door bracket provided at an inner side surface of a door sliding a door opening part of a vehicle body to open or close the door opening part; a body bracket provided in an invisible slider for sliding the door; a main arm having one end rotatably connected to one side of the door bracket and the other end rotatably connected to one side of the body bracket; a first link having one end rotatably connected to the other side of the body bracket; a second link having one end rotatably connected to the other end of the first link and the other end rotatably connected to the other side of the door bracket; and a third link having one end rotatably connected to one side of the main arm and the other end rotatably connected to a hinge point at which the first and second links are rotatably connected to each other.

The first link, the third link, the main arm, and the body bracket may form a parallelogram, and the second link, the door bracket, the main arm, and the third link may form a non-parallelogram.

The door bracket may have a length longer than that of the third link.

The second link may have a length longer than that of the first link.

The main arm may be connected to a driver provided in the invisible slider to receive a driving force.

The driver may include a motor and a sector gear having one side connected to the motor and the other side connected to the main arm.

A connection between main arm and the body bracket and a connection between the main arm and the third link may be connected to the sector gear, respectively.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Figure 3:
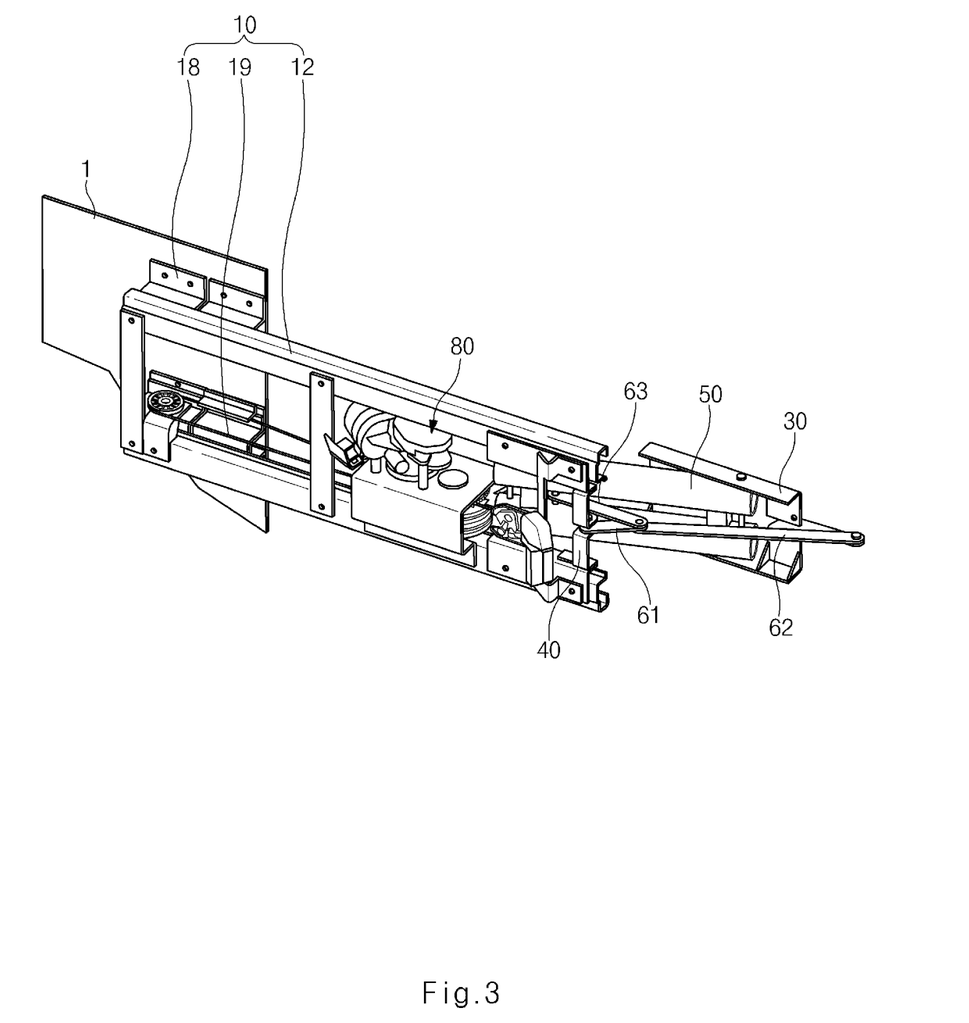
FIG. 3 is a view showing a structure of an invisible sliding door according to an exemplary embodiment of the present invention.

Hereinafter, the present disclosure will be described in detail with reference to the accompanying drawings. A sliding door link structure according to an exemplary embodiment of the present invention as seen in FIG. 3 has a six-bar link structure in which it includes a door bracket 30 provided at an inner side surface of a door 2 sliding a door opening part of a vehicle body 1 to open or close the door opening part; a body bracket 40 provided in an invisible slider 10 for sliding the door 2; a main arm 50 having one end rotatably connected to one side of the door bracket 30 and the other end rotatably connected to one side of the body bracket 40; a first link 61; a second link 62; and a third link 63.

The door bracket 30 is fixed to the inner side surface of the door 2 opening or closing the door opening part by sliding and rotating.

The body bracket 40 is fixed to the invisible slider 10 for sliding the door 2.

Figure 4:
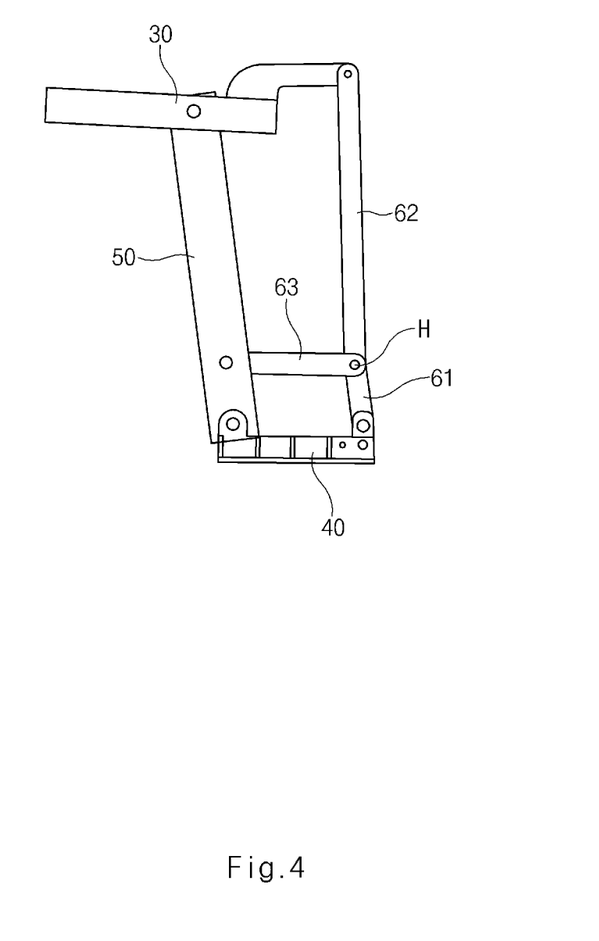
FIG. 4 is a view showing an invisible sliding door link structure according to the exemplary embodiment of the present invention.

According to FIG. 4, the main arm 50 has one end rotatably connected to one side of the door bracket 30 and the other end rotatably connected to one side of the body bracket 40.

The first link 61 has one end rotatably connected to the other side of the body bracket 40 and the other end extended toward the door bracket 30.

The second link 62 has one end rotatably connected to the other end of the first link 61 and the other end rotatably connected to the other side of the door bracket 30.

Figure 5:
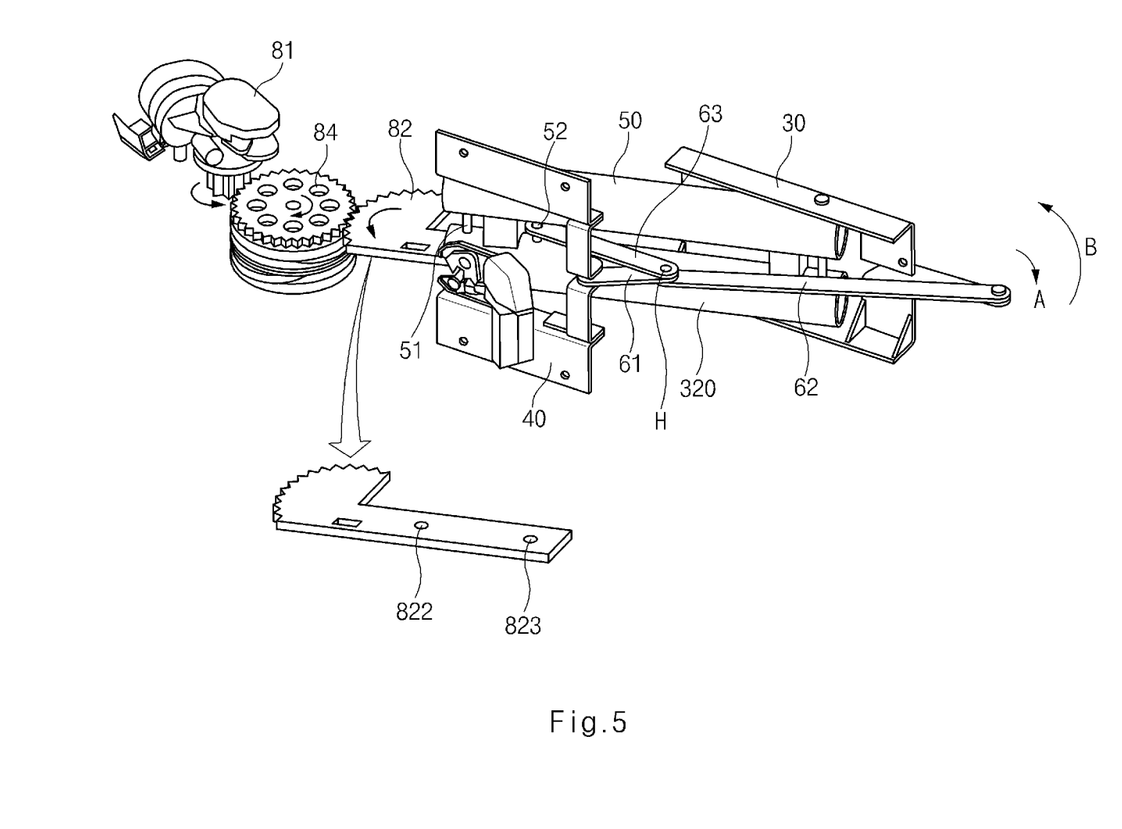
FIG. 5 is a view showing the invisible sliding door link structure according to the exemplary embodiment of the present invention and a driver.

The third link 63 has one end rotatably connected to one side of the main arm 50 and the other end rotatably connected to a hinge point H corresponding to a portion at which the first and second links 61 and 62 are rotatably connected to each other (see FIG. 5). Here, one side of the main arm 50 indicates a portion at which a sector gear 82 to be described below and the main arm 50 are rotatably connected to each other by a support shaft 823.

Here, the third link 63 has the same length as that of the body bracket 40. That is, a length between a point at which the main arm 50 disposed at one side of the body bracket 40 is rotatably connected to the body bracket 40 and a point at which the first link 61 is rotatably connected to the body bracket 40 is the same as that of the third link 63.

In addition, it is preferable that the door bracket 30 has a length longer than the third link 63. That is, a length between a point at which the main arm 50 disposed at one side of the door bracket 30 is rotatably connected to the door bracket 30 and a point at which the second link 62 is rotatably connected to the door bracket 30 is longer than that of the door bracket 30.

Therefore, a connection between the main arm 50 and the door bracket 30 is longer than that of the second link 62 and the door bracket 30.

Figure 6A:
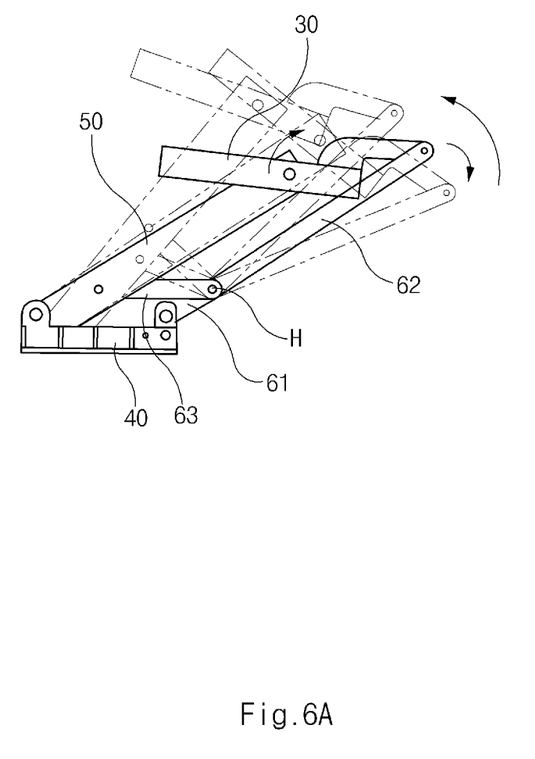
FIG. 6A is a view showing a tilting operation according to opening of the door in the invisible sliding door link structure according to the exemplary embodiment of the present invention.
Figure 6B:
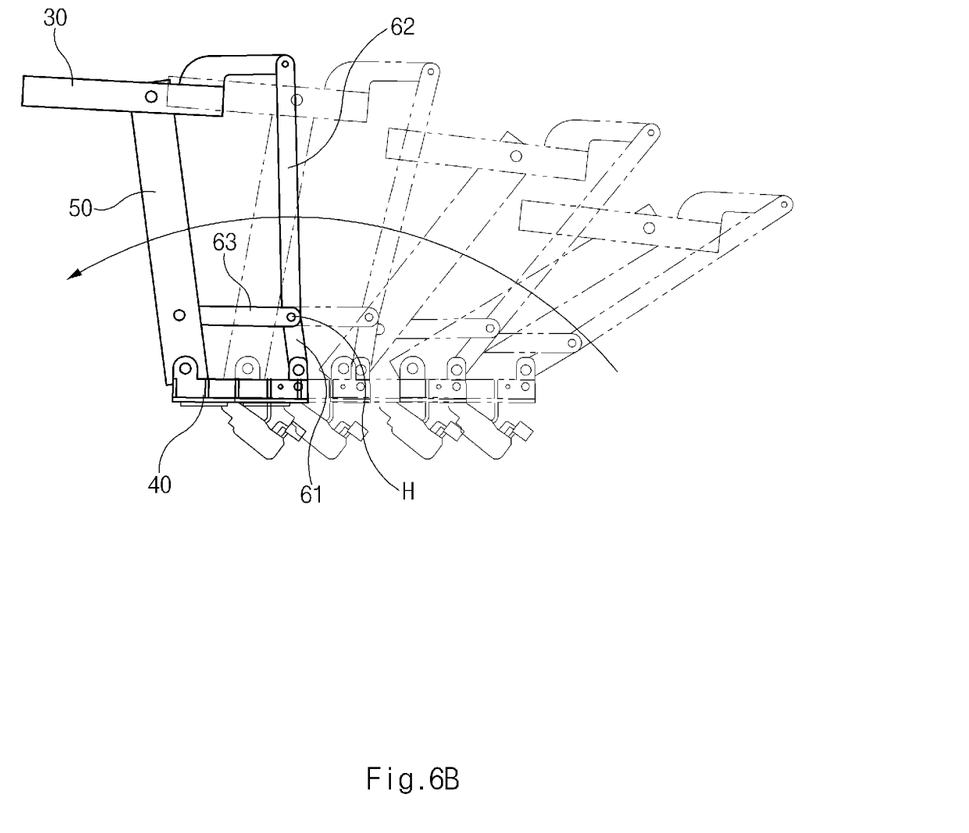
FIG. 6B is a view showing a sliding operation according to opening of the door in the invisible sliding door link structure according to the exemplary embodiment of the present invention.

As described above, the body bracket 40, the door bracket 30, the main arm 50, the first link 61, the second link 62, and the third link 63 are formed in a rotatable six-bar link structure (see FIGS. 6A and 6B). More specifically, the first link 61, the third link 63, the main arm 50, and the body bracket 40 are provided as a parallelogram link to form four-bar link movement, and the second link 62, the main arm 50, the door bracket 30, and the third link 63 are provided as a non-parallelogram link, such that tilting and rotating of the door 2 are enabled. A description thereof will be provided below.

Here, it is preferable that the second link 62 has a length longer than that of the first link 61. Therefore, a rotating radius of the second link 62 is decreased at the time of opening the door 2 to decrease a degree in which it is protruded outwardly of the vehicle body.

Link movement and sliding movement of the six-bar link structure as described above are combined with each other, such that the door is rotated and slid. To this end, the body bracket 40 is fixed to the invisible slider 10 for sliding the door, and the main arm 50 is connected to a driver 80 transferring a driving force to the invisible slider 10 and the six-bar link structure.

The invisible slider 10 is a component of sliding the door 2 to open or close the door opening part. More specifically, the invisible slider 10 includes a first slider fixed to the vehicle body, a slider rail 12 slid with respect to the first slider, and a second slider 19.

As shown in FIG. 3, the first slider 18 is fixed to a position adjacent to the door opening part of the vehicle body 1. The first slider 18 is configured of two mounting brackets fixed to the vehicle body 1 while having a predetermined interval therebetween in a vertical direction and rollers rotatably mounted on the mounting brackets.

The slider rail 12 is slidably mounted on the mounting bracket of the first slider 18. The slider rail 12 receives the two mounting brackets and rollers to roll-contact the roller and is slid with respect to the first slider 18.

In order to allow the slider rail 12 to be slid, the slider rail 12 is provided with the driver 80 and a second slider 19 for sliding the slider rail 12 with respect to the first slider 18.

More specifically, the second slider 19, which is a component for sliding the slider rail 12 with respect to the first slider 18, includes a drum and a wire. The drum is connected to a motor 81 of a driver 80 to be described below to receive a driving force from the motor 81. The wire winds around the drum and also around a pulley fixed to the slider rail 12 to be placed between the drum and the pulley. Therefore, when the drum is rotated by the driving force from the motor 81, the wire is wound and unwound to slide the slider rail 12 with respect to the first slider 18.

The body bracket 40 is connected to the slider rail 12 of the second slider 19 having the above-mentioned configuration to slide the door 2 along the slider rail 12.

The driver 80 includes the motor 81, a transfer gear 84 connected to the motor 81, and a sector gear 82 connected to the transfer gear 84. The motor 81 is supported by a motor bracket provided on the slider rail 12, and the sector gear 82 is connected to the motor 81 through the transfer gear 84.

As shown in FIG. 5, the sector gear 82 has a fan shape in which to include a gear disposed at an outer peripheral surface thereof, wherein the fan shape has a rectangular straight line part formed at one side thereof. The straight line part is provided with a center hole 822, which is the fan-shaped center of rotation, and is provided with a support hole 823 at a position spaced apart from the center hole 822 by a predetermined interval.

The driver 80 and the main arm 50 are connected to each other to transfer the driving force for a six-bar link movement.

More specifically, the main arm 50 has two bars disposed at upper and lower portions and formed integrally with each other. The sector gear 82 is inserted between the two bars, and a center shaft 51 and a support shaft 52 rotatably coupled to the center hole 822 and the support hole 823, respectively, of the sector gear 82 are vertically inserted into the center hole 822 and the support hole 823, respectively. Due to the above-mentioned configuration, when the sector gear 82 is rotated, the main arm 50 is also rotated around the center shaft 51 inserted into the center hole 822 of the sector gear 82. Although the case in which the main arm 50 has the two bars formed integrally with each other has been described in the present embodiment, the main arm 50 may also have a single bar and be connected to the sector gear 82.

An operation of the invisible sliding door link structure having the configuration as described above will be described. First, as shown in FIG. 5, when the motor 81 of the driver 80 is rotated in a counterclockwise direction, the sector gear 82 is rotated around the center shaft 51 in the counterclockwise direction through the transfer gear 84. Therefore, the main arm 50 is rotated around the center shaft 51 in the counterclockwise direction. As the main arm 50 is rotated, the third link 63 rotatably connected to the support shaft 52 of the main arm 50 has a force applied thereto so as to be moved according to the main arm 50. Therefore, the first link 61 rotatably connected to the hinge point H of the other end of the third link 63 is also rotated with respect to the body bracket 40. Therefore, in the parallelogram link configured of the first link 61, the third link 63, the main arm 50, and the body bracket 40, the first link 61 is also rotated by a rotation amount of the main arm 50.

One end of the second link 62 is rotatably connected to the hinge point H at which the first and third links 61 and 63 are rotatably connected to each other. As the parallelogram link is rotated as described above, as shown in FIG. 6A, the hinge point H is moved toward the main arm 50, and the other end of the second link 62 connected to the door bracket 30 is first rotated (tilted) by a small angle around the hinge point H in a clockwise direction, that is, an A direction of FIG. 5. Therefore, a rear side of the door is first opened while being rotated around the other end of the second link 62. Here, the second link 62 has the length longer than that of the first link 61, thereby making it possible to decrease a degree in which the rear of the door 2 is opened while being rotated. This allows the door 2 to be opened while occupying a narrow space in a width direction of the vehicle at the time of opening the door 2, thereby allowing a passenger to easily get on or get off the vehicle even in a narrow parking space.

After the tilting operation as described above, when the main arm 50 further rotates, the door bracket 30 connected to the other end of the main arm 50 moves according to the rotation of the main arm 50. Therefore, the second link 62 rotatably connected to the other side of the door bracket 30 also rotates by a large angle in the counterclockwise direction, that is, a B direction of FIG. 5, together with the main arm 50. Therefore, the non-parallelogram link, configured of the second link 62, the main arm 50, the door bracket 30, and the third link 63, forms a link movement.

Together with the six-bar link movement as described above, as shown in FIG. 6B, the slider rail 12 slides with respect to the first slider 18 by the driver 80, such that the body bracket 40 connected to the slider rail 12 is also slid together with the slider rail 12. Therefore, the door 2 is also slid to open the door opening part.

As set forth above, an invisible sliding door link structure for an invisible sliding door that may be operated without a rail structure of a vehicle body is developed, thereby making it possible to solve a design restriction and a space restriction due to the rail of the vehicle body according to the prior art.

Although the present disclosure has been described with reference to the exemplary embodiment shown in the accompanying drawings, it is only illustrative and various exemplary embodiments are possible. Therefore, the scope of the present disclosure is to be defined by the claims.

What is claimed is:
1. An invisible sliding door link structure, comprising:
 a door bracket disposed at an inner side surface of a door such that the door slides to open or close a door opening part;
 a body bracket disposed in an invisible slider for sliding the door;
 a main arm having a first end and a second end, the first end of the main arm being rotatably connected to a first side of the door bracket, the second end of the main arm being rotatably connected to a first side of the body bracket;
 a first link having a first end rotatably connected to a second side of the body bracket;
 a second link having a first end and a second end, the first end of the second link being rotatably connected to a second end of the first link, the second end of the second link being rotatably connected to a second side of the door bracket; and
 a third link having a first end and a second end, the first end of the third link being rotatably connected to one side of the main arm, the second end of the third link being rotatably connected to a hinge point at which the first and second links are rotatably connected to each other, wherein:
 the main arm is connected to a driver provided in the invisible slider to receive a driving force,
 the driver includes:
  a motor; and
  a sector gear having a first side and a second side, the first side being connected to the motor, the second side being connected to the main arm through a center shaft and connected to the third link through a support shaft.

2. The invisible sliding door link structure according to claim 1, wherein the first link, the third link, the main arm, and the body bracket form a parallelogram, and
 the second link, the door bracket, the main arm, and the third link form a non-parallelogram.

3. The invisible sliding door link structure according to claim 2, wherein the door bracket has a length longer than a length of the third link.

4. The invisible sliding door link structure according to claim 1, wherein the second link has a length longer than a length of the first link.

5. An invisible sliding door link structure, comprising:
 a door bracket disposed at an inner side surface of a door such that the door slides to open or close a door opening part;
 a body bracket disposed in an invisible slider for sliding the door;
 a main arm having a first end and a second end, the first end of the main arm being rotatably connected to a first side of the door bracket, the second end of the main arm being rotatably connected to a first side of the body bracket;
 a first link having a first end rotatably connected to a second side of the body bracket;
 a second link having a first end and a second end, the first end of the second link being rotatably connected to a second end of the first link, the second end of the second link being rotatably connected to a second side of the door bracket; and
 a third link having a first end and a second end, the first end of the third link being rotatably connected to one side of the main arm, the second end of the third link being rotatably connected to a hinge point at which the first and second links are rotatably connected to each other, wherein:
 the main arm is connected to a driver provided in the invisible slider to receive a driving force,
 the driver includes:
  a motor; and
  a sector gear having a first side connected to the motor and a second side connected to the main arm, and
 a point at which the main arm and the body bracket are connected to each other and a point at which the main arm and the third link are connected to each other are connected to the sector gear, respectively.

* * * * *